United States Patent
Grenci

(10) Patent No.: US 9,592,704 B2
(45) Date of Patent: Mar. 14, 2017

(54) METHOD OF PRODUCING RUBBER TYRE COMPOUNDS

(71) Applicant: BRIDGESTONE CORPORATION, Tokyo (JP)

(72) Inventor: Valeria Grenci, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/652,264

(22) PCT Filed: Dec. 18, 2013

(86) PCT No.: PCT/IB2013/061115
§ 371 (c)(1),
(2) Date: Jun. 15, 2015

(87) PCT Pub. No.: WO2014/097195
PCT Pub. Date: Jun. 26, 2014

(65) Prior Publication Data
US 2015/0329710 A1    Nov. 19, 2015

(30) Foreign Application Priority Data

Dec. 18, 2012 (IT) .............................. RM2012A0646

(51) Int. Cl.
*C08L 9/06* (2006.01)
*B60C 1/00* (2006.01)
*C08L 21/00* (2006.01)

(52) U.S. Cl.
CPC *B60C 1/00* (2013.01); *C08L 9/06* (2013.01); *C08L 21/00* (2013.01); *C08L 2205/025* (2013.01)

(58) Field of Classification Search
CPC ...... C08K 5/548; C08L 9/06; C08L 2205/025
See application file for complete search history.

(56) References Cited

U.S. PATENT DOCUMENTS

| 7,714,051 B2 * | 5/2010 | Hahn ........................ B60C 1/00 524/114 |
| 2008/0161458 A1 | 7/2008 | Fox et al. |
| 2011/0021662 A1 * | 1/2011 | Di Ronza .............. C08K 5/101 523/157 |
| 2012/0296008 A1 | 11/2012 | Di Ronza et al. |

FOREIGN PATENT DOCUMENTS

| EP | 0 732 362 A1 | 9/1996 |
| EP | 0 791 622 A1 | 8/1997 |
| KR | 10 2010 0002754 | * 1/2010 |
| WO | 2009/092811 A1 | 7/2009 |
| WO | 2012/085893 A1 | 6/2012 |
| WO | 2012/085895 A1 | 6/2012 |

OTHER PUBLICATIONS

KR 10 2010 0002754 machine translation (2010).*
International Search Report of PCT/IB2013/061115, dated Mar. 31, 2014. [PCT/ISA/210].

* cited by examiner

*Primary Examiner* — Kuo-Liang Peng
(74) *Attorney, Agent, or Firm* — Sughrue Mion, PLLC

(57) ABSTRACT

A method of producing rubber tire compounds, including a first mixing step in which at least one cross-linkable, unsaturated-chain polymer base, silica, and a silane bonding agent in the alkoxymercaptoalkyl-silane class are mixed together; and a final mixing step in which a curing system having at least sulphur and accelerants is added to and mixed with the mix. A nucleophile compound and zinc oxide are mixed with the polymer base at the first mixing step. And the method includes a second mixing step between the first mixing step and the final mixing step, and in which a silane bonding agent in the polysulphide organosilane class is added to and mixed with the mix from the first mixing step.

12 Claims, No Drawings

METHOD OF PRODUCING RUBBER TYRE COMPOUNDS

CROSS REFERENCE TO RELATED APPLICATIONS

This application is a National Stage of International Application No. PCT/IB2013/061115 filed Dec. 18, 2013, claiming priority based on Italian Patent Application No. RM2012A000646, filed Dec. 18, 2012, the contents of all of which are incorporated herein by reference in their entirety.

TECHNICAL FIELD

The present invention relates to a method of producing rubber tyre compounds.

BACKGROUND ART

Silica has long been used as a reinforcing filler in tread compounds, as a partial or total substitute for carbon black, because of the advantages it affords in terms of rolling resistance and wet road-holding performance.

Silica is used in conjunction with silane bonding agents, which, bonding with silanol groups, prevent the formation of hydrogen bonds between silica particles and, at the same time, bond the silica chemically to the polymer base.

Trialkoxymercaptoalkyl-silanes are a particularly interesting class of silane bonding agents, especially in terms of the advantages they afford in reducing both rolling resistance and the emission of volatile substances.

The most advantageous is the compound of formula I below.

$$SH(CH_2)_3SiR^1R^2_2 \qquad (I)$$

where:
$R^1$ is —OCH$_2$CH$_3$ and
$R^2$ is —O(CH$_2$CH$_2$O)$_5$(CH$_2$)$_{12}$CH$_3$ Despite the advantages referred to above, however, this class of silane bonding agents produces an increase in the viscosity of the compound and, hence, processing problems.

To solve the processing problems involved, plasticizing oils are normally added to the compound, but this has the effect of producing additional problems by impairing the physical characteristics, such as wear resistance, of the compound.

A need is therefore felt for a method of producing rubber tyre compounds, which allows the use of silane bonding agents in the trialkoxymercaptoalkyl-silane class, but without incurring processing problems and/or impairing the physical characteristics of the compound.

DISCLOSURE OF INVENTION

One object of the present invention is a method of producing rubber tyre compounds, comprising a first mixing step in which at least one cross-linkable, unsaturated-chain polymer base, silica, and a silane bonding agent in the alkoxymercaptoalkyl-silane class are mixed together; and a final mixing step in which a curing system comprising at least sulphur and accelerants is added to and mixed with the mix; said method being characterized in that a nucleophile compound and zinc oxide are mixed with the polymer base at said first mixing step, and by comprising a second mixing step between said first mixing step and said final mixing step, and in which a silane bonding agent in the polysulphide organosilane class is added to and mixed with the mix from said first mixing step. Preferably, said second mixing step is interrupted after a mixing time ranging from 200 to 300 sec., and at a mix temperature of below 150° C.

Preferably, said silane bonding agent in the alkoxymercaptoalkyl-silane class makes up 10 to 60% in parts of the total quantity of silane bonding agent used.

Preferably, the total quantity of silane bonding agent used ranges from 3 to 20 phr.

Preferably, the silane bonding agent is a trialkoxymercaptoalkyl-silane, and more preferably a compound of formula I $$SH(CH_2)_l SiR^1R^2_2 \qquad (I)$$

where:
l is an integer of 1 to 6
$R^1$ is —O(CH$_2$)$_g$CH$_3$
$R^2$ is —O(CH$_2$CH$_2$O)$_m$(CH$_2$)$_n$CH$_3$
g is an integer of 0 to 5
m is an integer of 2 to 8, and
n is an integer of 3 to 20.

Preferably, l is 3, g is 1, m is 5, and n is 12.

Preferably, the mix contains 0.2 to 2 phr of the nucleophile compound.

Preferably, 0.5 to 3.0 phr of zinc oxide is used at the first mixing step.

Preferably, said nucleophile compound is selected from curing accelerators.

Preferably, the nucleophile compound is in the group comprising amines, disulphides, guanidines and derivatives thereof, thiourea and derivatives thereof, thiazoles, thiurams, sulphenamides and derivatives thereof, dithiocarbamates, dithiophosphates, xanthates, quinolines, phenylenediamines and derivatives thereof, phenols and derivatives thereof, and mixtures thereof; more preferably, the nucleophile compound is in the group comprising benzothiazyl-cyclohexyl-sulphenamide (CBS), N-tert-butyl-2-benzothiazylsulphenamide (TBBS), 2-mercaptobenzothiazole (MBT), zinc salts of 2-mercaptobenzothiazole (ZMBT), benzothiazyl-2-dicyclohexyl sulphenamide (DCBS), diphenyl guanidine (DPG), triphenyl guanidine (TPG), diphenyl thiourea (DPTU), benzothiazole disulphide (MBTS), hexamethylene tetramine (HMT), tetrabenzylthiouramdisulphide (TBzTD), and mixtures thereof.

A further object of the present invention is a compound produced using the above method.

A further object of the present invention is a tyre, at least one part of which is made from a compound produced using the above method.

BEST MODE FOR CARRYING OUT THE INVENTION

The following are non-limiting examples for a clearer understanding of the present invention.

EXAMPLES

Five compounds (A-E) were produced: one (A) produced in accordance with the teachings of the present invention, and four control compounds (B-E).

As will become clearer later on, the control compounds differ from the compound according to the present invention by only containing the silane bonding agent in the trialkoxymercaptoalkyl-silane class, or by containing no nucleophile compound at the first mixing step, or by different timing of the second mixing step.

For an accurate comparison, all the examples contain the same total amount of silane bonding agent.

As described below, each compound was subsequently tested to determine viscosity, rolling resistance and abrasion resistance. The example compounds were produced as described below:

—Compound Production—

(First Mixing Step)

Prior to mixing, a 230-270-liter, tangential-rotor mixer was loaded with the cross-linkable polymer base, part of the silica, the trialkoxymercaptoalkyl-silane class silane bonding agent, zinc oxide, and, depending on the examples, the nucleophile compound, to a fill factor of 66-72%.

The mixer was operated at a speed of 40-80 rpm, and the resulting mix unloaded on reaching a temperature of 140-160° C.

(Second Mixing Step)

Another part of the silica and, depending on the examples, a silane bonding agent in the polysulphide organosilane class were added to the mix from the first mixing step.

The mixer was operated at different speeds, depending on the examples. More specifically, in the case of control compounds B-D, the mix reaches a temperature of roughly 150° C. in a mixing time of 90-120 seconds, whereas, in the case of the compound according to the invention and control compound E, mixing was interrupted after 210 seconds and at a mix temperature of 140° C.

(Third Mixing Step)

The curing system was added to the mix from the second mixing step to a fill factor of 63-67%.

The mixer was operated at a speed of 20-40 rpm, and the resulting mix unloaded on reaching a temperature of 100-110° C.

Table I shows the compositions in phr of the five compounds produced in accordance with the teachings of the present invention.

TABLE I

|  | A | B | C | D | E |
|---|---|---|---|---|---|
| 1st mixing step ||||||
| S-SBR | 45.0 |||||
| E-SBR | 55.0 |||||
| ZnO | 1.5 |||||
| SILICA | 60.0 |||||
| SI363 | 3.00 | 9.00 | 3.00 | 3.00 | 9.00 |
| MBTS | 0.5 | — | — | 0.5 | 0.5 |
| 2nd mixing step ||||||
| SILICA |  |  | 20 |  |  |
| SI69 | 6.0 | — | 6.0 | 6.0 | — |
| Final mixing step ||||||
| ZnO | 1 |||||
| Sulphur | 2 |||||
| Accelerants | 2 |||||

S-SBR and E-SBR have a mean molecular weight of $800\text{-}1500\times10^3$ and $500\text{-}900\times10^3$ respectively. More specifically, S-SBR contains 10-45% styrene and 20-70% vinyl, and E-SBR contains 20-45% styrene.

The silica used is marketed by EVONIK as ULTRASIL VN3 GR, and has a surface area of 175 m²/g.

SI363 is the trade name of a silane bonding agent in the trialkoxymercaptoalkyl-silane class and of formula $SH(CH_2)_3Si(OCH_2CH_3)(O(CH_2CH_2O)_5(CH_2)_{12}CH_3)_2$ MBTS is benzothiazole disulphide.

SI69 is the trade name of a silane bonding agent in the polysulphide organosilane class and of formula $(CH_3CH_2O)_3Si(CH_2)_3S_4(CH_2)_3Si(OCH_2CH_3)_3$ As stated, compounds A-E were tested to determine viscosity, rolling resistance and abrasion resistance.

More specifically, viscosity was measured as per ASTM Standard D6080, rolling resistance as per ASTM Standard D5992, and abrasion resistance as per DIN Standard 53516.

As any expert knows, tanδ values at 60° C. are closely related to rolling resistance. More specifically, the lower the 60° C. tanδ value, the better the rolling resistance.

To show more clearly the advantages of the compounds according to the present invention, the test results were indexed with respect to those of control compound B.

Table II shows the above test results of the four compounds A-E produced in accordance with the present invention.

TABLE II

|  | A | B | C | D | E |
|---|---|---|---|---|---|
| Viscosity | 65 | 100 | 80 | 75 | 90 |
| tanδ at 60° C. | 102 | 100 | 120 | 105 | 100 |
| Abrasion resistance | 135 | 100 | 115 | 125 | 100 |

As shown in Table II, compound A produced using the method according to the present invention clearly gives the best results as a whole. More specifically, compared with the control compounds, the compound A results are far superior in terms of viscosity and abrasion resistance, while also showing improvement in rolling resistance.

More specifically, comparison with compound C shows how the advantages sought cannot be achieved solely by the presence of the silane bonding agent in the polysulphide organosilane class at the second mixing step; comparison with compound D shows how the advantages sought cannot be achieved by the presence of the nucleophile compound at the first mixing step and the presence of the silane bonding agent in the polysulphide organosilane class at the second mixing step; and comparison with compound E shows how the advantages sought cannot be achieved by the presence of the nucleophile compound at the first mixing step, together with a second mixing step with the times and temperatures of the method according to the invention.

The Applicant, on the other hand, has surprisingly discovered that the conditions claimed in claim 1 provide for achieving the results in Table II.

The invention claimed is:

1. A method of producing rubber tyre compounds, comprising a first mixing step in which at least one cross-linkable, unsaturated-chain polymer base, silica, and a silane bonding agent in the alkoxymercaptoalkyl-silane class are mixed together to form a mix;

and a final mixing step in which a curing system comprising at least sulphur and accelerants is added to and mixed with the mix; wherein a nucleophile compound and zinc oxide are mixed with the polymer base at said first mixing step, and wherein the method comprises a second mixing step between said first mixing step and said final mixing step, and wherein a silane bonding agent in the polysulphide organosilane class is added to and mixed with the mix from said first mixing step; said second mixing step being interrupted after a mixing time ranging from 200 to 300 sec., and at a mix temperature of below 150° C.

2. A method as claimed in claim 1, characterized in that said silane bonding agent in the alkoxymercaptoalkyl-silane class makes up 10 to 60% in parts of the total quantity of silane bonding agent used.

3. A method as claimed in claim 1, characterized in that the total quantity of silane bonding agent used ranges from 3 to 20 phr.

4. A method as claimed in claim 1, characterized in that the silane bonding agent in the first mixing step is a trialkoxymercaptoalkyl-silane.

5. A method as claimed in claim 1, characterized in that the silane bonding agent in the first mixing step is a compound of formula I $$SH(CH_2)_l SiR^1 R^2_2 \quad (I)$$

where:
l is an integer of 1 to 6
$R^1$ is —$O(CH_2)_g CH_3$
$R^2$ is —$O(CH_2 CH_2 O)_m (CH_2)_n CH_3$
g is an integer of 0 to 5
m is an integer of 2 to 8, and
n is an integer of 3 to 20.

6. A method as claimed in claim 5, characterized in that l is 3, g is 1, m is 5, and n is 12.

7. A method as claimed in claim 1, characterized in that the mix contains 0.2 to 2 phr of the nucleophile compound.

8. A method as claimed in claim 1, characterized in that 0.5 to 3.0 phr of zinc oxide is used at the first mixing step.

9. A method as claimed in claim 1, characterized in that the nucleophile compound is in the group comprising amines, disulphides, guanidines and derivatives thereof, thiourea and derivatives thereof, thiazoles, thiurams, sulphenamides and derivatives thereof, dithiocarbamates, dithiophosphates, xanthates, quinolines, phenylenediamines and derivatives thereof, phenols and derivatives thereof, and mixtures thereof.

10. A method as claimed in claim 9, characterized in that the nucleophile compound is in the group comprising benzothiazyl-cyclohexyl-sulphenamide (CBS), N-tert-butyl-2-benzothiazylsulphenamide (TBBS), 2-mercaptobenzothiazole (MBT), zinc salts of 2-mercaptobenzothiazole (ZMBT), benzothiazyl-2-dicyclohexyl sulphenamide (DCBS), diphenyl guanidine (DPG), triphenyl guanidine (TPG), diphenyl thiourea (DPTU), benzothiazole disulphide (MBTS), hexamethylene tetramine (HMT), tetrabenzylthiouramdisulphide (TBzTD), and mixtures thereof.

11. A rubber compound produced using the method as claimed in claim 1.

12. A tyre, at least one part of which is made from a compound as claimed in claim 11.

\* \* \* \* \*